US006200648B1

(12) United States Patent
Collins

(10) Patent No.: US 6,200,648 B1
(45) Date of Patent: Mar. 13, 2001

(54) METHOD OF OBTAINING A SIMULATED ETCHING OF A DEEP ACID ETCH

(76) Inventor: George E. Collins, 141 N. LaGrange Rd., LaGrange, IL (US) 60525

( * ) Notice: Subject to any disclaimer, the term of this patent is extended or adjusted under 35 U.S.C. 154(b) by 0 days.

(21) Appl. No.: 09/161,365

(22) Filed: Sep. 28, 1998

(51) Int. Cl.[7] ...................................................... C08J 7/04

(52) U.S. Cl. .......................... 427/511; 427/257; 427/258; 427/271; 427/385.5; 427/407.1; 427/514; 427/558; 427/559

(58) Field of Search .................................... 427/510, 511, 427/514, 558, 559, 257, 258, 271, 385.5, 407.1

*Primary Examiner*—Bernard Pianalto

(57) ABSTRACT

The invention relates to a method of obtaining a simulated deep acid etch sign. The steps include creating a custom image on the sign through computer programming and hand applied manipulation. A coating of ink is applied and then cured with ultra violet light, post cured and then providing a conventional mirroring process.

8 Claims, No Drawings

METHOD OF OBTAINING A SIMULATED ETCHING OF A DEEP ACID ETCH

TECHNICAL FIELD

This invention relates to the field of glass signs and particularly those signs in which there is a printed pattern that is often multi colored to provide an attractive display or advertisement.

BACKGROUND OF THE INVENTION

Glass signs and the like have been around a long time and the beauty of the glass sign is enhanced when in addition to mere lettering there is a pattern present. A particular attractive pattern on signs have heretofore been inscribed on a sign by employing a deep acid etch. Such a sign has been available for a number of years but the relatively high cost of deep acid etching has severely limited their utilization and are only used in the more high priced type of signage and thus while highly desirable deep acid etching is not used in general commercial production. There has long been the desire to provide a sign with the high end look of the type provided by deep acid etching but lower in cost, which sign would be in large demand by customers.

Various methods have been tried to simulate acid etching and while they have met with some degree of success the current signs available that simulate acid etching do not provide the versatility, color variability and other attributes that are present in deep acid etched signs. Various ways have been tried to simulate deep acid etching such as reinforced ink patterns and the utilization of special inks that when subjected to ultraviolet light will provide a simulated etching effect. However, there continues a need to improve on the methods available to provide glass signs that give the appearance of deep acid etching without actually going through the expensive process required to deep acid etch.

SUMMARY OF THE INVENTION

In accordance with the present invention there is provided a sign that employs traditional screen printing and mirroring techniques along with new ultraviolet technology and other attributes to be disclosed herein that simulates deep acid etching. The sign can not readily be discerned from deep acid etching and clearly gives the effect of deep acid etching. It will require a very critical eye to notice any difference and therefore those viewing such will see a sign that creates the impact and effect that deep acid etching provided in the past without having to be deep acid etched and its attendant cost. Thus, the sign will provide a very high quality sign having the high quality look that the market place has long desired at a very reasonable cost.

As aforementioned the novel method disclosed herein provides a sign, that for all intents and purposes, looks as if it has been deep acid etched. The novel process begins in the conventional manner in that a custom image is created on the sign through computer programming and hand-applied manipulation gives the sign the crinkled edge appearance of deep acid etching. As an example, the artist creates a solid letter with the center voided out in a "scratching" pattern. To those skilled in the art it is understood that varying degrees of "scratching" can be used to create different aesthetic appearances. The film positive is then shot onto a 140 mesh monofilament polyester screen fabric, using conventional diazo photopolymer direct emulsion, although other comparable emulsions and screen meshes can be substituted. Once the screen is prepared the substrate such as for example a double strength 3.0 mm float glass is washed and printed from the second surface for a mirror or glass plaque.

In accordance with the present invention there is employed a special UV coating which is applied as a clear or as a color transparent. When this coating is applied with a 140 mesh or higher and properly cured the ink will react to the ultraviolet light in such a way as to cure first on the outer areas, then ultimately cure all the way through. This provides the sign with a crinkled look, which, when combined with the manipulated art work, appears quite similar to deep acid etching. As noted, the sign can utilize different screen meshes and other variations would include changing the UV curing which will change the crinkle effect as hereinafter described in greater detail. There are a number of variables that can be employed to provide the desired sign and these will be discussed and form part of the present invention.

One example, is to screen a transparent yellow ultra-violet ink through a 140 mesh and with and with a 70 durometer squeegee and then run it immediately through a UV curing unit using one lamp set at 300 watts, and a belt speed set at 28 feet per minute. Given these variables one can change the parameters of the sign to obtain whatever effect they desire. The aforementioned arrangement achieves an attractive crinkle that closely resembles actual acid etching. However, here again depending on the width of the screen image, and depending on the desired effect may require different combinations of lamps and or belt speed. For example, a less pronounced crinkle may be achieved by using a lamp at 350 watts but speeding up the belt to 45 feet per minute. Conversely, a tighter crinkle may be the result if two lamps are used at 200 watts each and the belt is run at 25 feet per minute. Various combinations of heat lamps and belt speed will give excellent results and the best way to arrive at the required effect is to try different settings until the desired look is achieved. This provides those practicing the novel invention an unlimited pallet of effects from which to choose from.

Depending on the initial cure, a 5 to 25 minute post cure is necessary before going to the next step. In one example one can print a transparent yellow lacquer ink on top of the (second surface) the cured UV ink. This will give the voided out areas, mentioned above in the creation of the art work a transparent color similar to the color of the UV ink. However, it is possible to leave the voided areas as they are, with no lacquer if this look is desired. In the example where the lacquer is used it will be printed through a 140 mesh screen on top of the UV ink and simultaneously into the voided areas. This coated piece now goes into a batch oven of over 150° F. for one hour. This curing can also be achieved with a forced air curing unit, air drying or whatever other applicable curing equipment is available. If the piece calls for any other screen decorating with other inks such as enamels, epoxies, UV or lacquers they can, of course, be printed at this time, or before the novel process making up the present invention.

Once the final cure is reached for the screened patterns, the next step in the sign making process is the mirroring process, which is somewhat conventional in nature. Conventional silvering (or mirroring) techniques apply, but through variations and the silvering suppliers used will result in different plating characteristics. Basically, the process calls for the glass to be placed on a silvering conveyer, where it will go through a cleaning process (using cerium oxide for example), the sensitizing section (where the inks and glass are prepared for silver adhesion), the silvering section, and a copper section, and if this is the final silvering step, the mirror backing section. In the example provided above the mirror backing is provided via a curtain coater wherein 1) the glass goes through a preheat section which raises the temperature of the glass to approximately 130° F., 2) the paint is mixed to a viscosity of approximately 27 seconds through a #3 Zahn cup, and 3) then run through a recirculating paint system which utilizes gravity to form a curtain of paint falling perpendicular to the conveyer. As the conveyor speeds the glass through the curtain a uniform coating of backing paint is applied. The glass continues through the final oven section, eventually reaching an exit temperature of about 180° F. The final section cleans the glass to a finished state, after which it is ready for cutting (if necessary) and final inspection and packaging.

An alternative to the aforementioned approached is used if one requires an "antique" mirror. In this embodiment the glass is not washed first but rather placed directly onto the silvering conveyer, and ultimately receiving two trips through the line. For the first application it goes through the same two initial steps as previously mentioned, but when it reaches the silver section, it only receives a light splattered application of silver rather than the normal continuous spray application. At this point the first silvering process is complete and it does not receive any copper or backing paint.

After the aforementioned silvering process the glass is taken to a screening press, where the mirror backing will be applied. This time, the art work must be solid leaving openings only where the screen graphics, including the new pattern to simulate a deep etched pattern is printed. On this example a 230 mesh fabric is used for finer detail. Of course higher or lower mesh counts may be used depending on the detail of the art and the paint medium to be used. In this example conventional enamel is used for the "backup" screening.

The glass is then placed upon the press with the mirror side-up and the reversed image on the screen, (again second surface printing) will be printed onto the silver. This will make permanent what ever silver receives a coating of paint. Thus the antique mirroring is preserved by the screening of the backing paint. Areas left exposed will later be removed. Once the screening occurs the glass is sent to the batch oven again for one hour at 150° F. Obviously if a different drying method or ink system is used the curing may be different. For example, if a UV ink is used a 355 mesh might be used for the screening and a UV curing unit used for the curing. Whatever ink system is used it is recommended that the color of the ink be black or at least dark. The antique look relies on the color of the ink to bring out the "splattered" silvering that was applied. In other words the lighter areas of silver becomes almost transparent, allowing the color of the ink to show through. When black or dark lines are used a very rich (smoked) mirroring effect is achieved.

The next step calls for removal of the exposed areas of silver where the screen graphics will later be applied. The silver removal can be done by hand or machine. In the described embodiment a "face down stripper" machine that uses a proprietary formulation of acids to quickly remove and wash the glass is used that leaves the glass only with the antique background and a clear glass where the graphics can now be printed. At this the point the UV ink is applied by a press (as described above) which is followed by any other screening necessary.

In this double silver application there is more opportunity for variation and additional applications open up. Specifically, instead of following the novel screening technique described herein with a lacquer application by a screening press inks can now be applied if desired by a spray gun similar to the auto industry's use of spray paint. Again any color combination can be used and operators can vary the intensity of both color and thickness depending upon the desired results. Curing of the sprayed substrate is similar to the screened versions which in this case consists of one hour in a batch oven heated to a 150° F. as well as air drying or using other conveyerized curing units.

At this point a second run through a silvering conveyer is called for. The procedure is identical to the conventional silvering line described above, with both silver and copper being applied along with the applicable final backing paint.

Another exception to the backing paint application would be if a second surface lithographic, print or other graphics were to be placed in the piece which for our purposes will be called an insert. To allow the insert to be mounted into the mirror the curtain coater backing paint on the silver lining would be possible, since it would seal the mirror from the back (second surface) and prohibit any application. Therefore the curtain coater is replaced by a screening step similar to the antique "backup step" described above. In this case the backing is only necessary behind the imposed simulated deep acid etch pattern and any other inks that were applied behind it. However the backing paint must also leave open a "window" where the insert can be place. Generally then this secondary back up will only print directly behind the simulated etched pattern and nowhere else. Screen meshes are usually 140 mesh and the ink systems insuring parameters are as flexible as previously mentioned.

Following the cure there would be a secondary removal of the secondary silvering step using the same "face down stripping" machine or processes described earlier. There will be a clean and finished piece with a clear window ready for application of the insert. Obviously this description includes a few variations on a very flexible theme. Applicants' novel process can be used in conjunction with a wide variety of ink systems on clear glass as well as many other substrates and the possibilities of variations in the art work and its application leave the limitations only to the imagination.

It is intended to cover by the following claims all those features and embodiments that come within the true spirit and scope of the invention.

What is claimed:

1. The method of obtaining a simulated deep acid etch sign including the steps of creating a custom image on the sign through computer programming and hand-applied manipulation, applying a coating to a substrate such as a clear or color transparent ink onto a 140 mesh screen or higher, running the substrate through a ultra-violet curing unit and curing the ink first on the outer areas and then ultimately all the way through to give it the crinkled look similar to deep acid etching, post curing the sign and then providing a conventional mirroring process.

2. The method is set forth in claim 1 in which the desired crinkle effect is achieved by running the coated substrate through a ultra-violet curing unit using two 200 watt lamps on a belt having a speed of approximately 25 feet per minute.

3. The method set forth in claim 1 in which the desired crinkle effect is achieved by running the coated substrate through a ultra-violet curing unit using a 350 watt lamp on a belt having a speed of approximately 45 feet per minute.

4. The method as set forth in claim 1 in which the screening is done with a transparent yellow ultra-violet ink through 140 mesh screen and with a 70 durometer squeege and the coated substrate is then run on a belt immediately through a UV curing unit using one lamp set at 300 watts at a belt speed set at 28 feet per minute which will provide an attractive wrinkle that closely resembles actual acid etching.

5. The method as set forth in claim 1 in which a film positive is shot onto a 140 mesh monofilament polyester screen fabric using conventional diazo photopolymer direct emulsion.

6. The method set forth in claim 1 in which the post cure is on the order of 5 to 20 minutes.

7. The method as set forth in claim 1 in which a transparent yellow lacquer ink is printed on top of the cured UV ink through 140 mesh screen and curing the sign in a batch oven of approximately 150° F. for one hour.

8. The method as set forth in claim 7 including the steps of screen decorating with other inks such as enamels, epoxies or lacquers.

* * * * *